Feb. 23, 1954        J. KANTOR        2,670,117

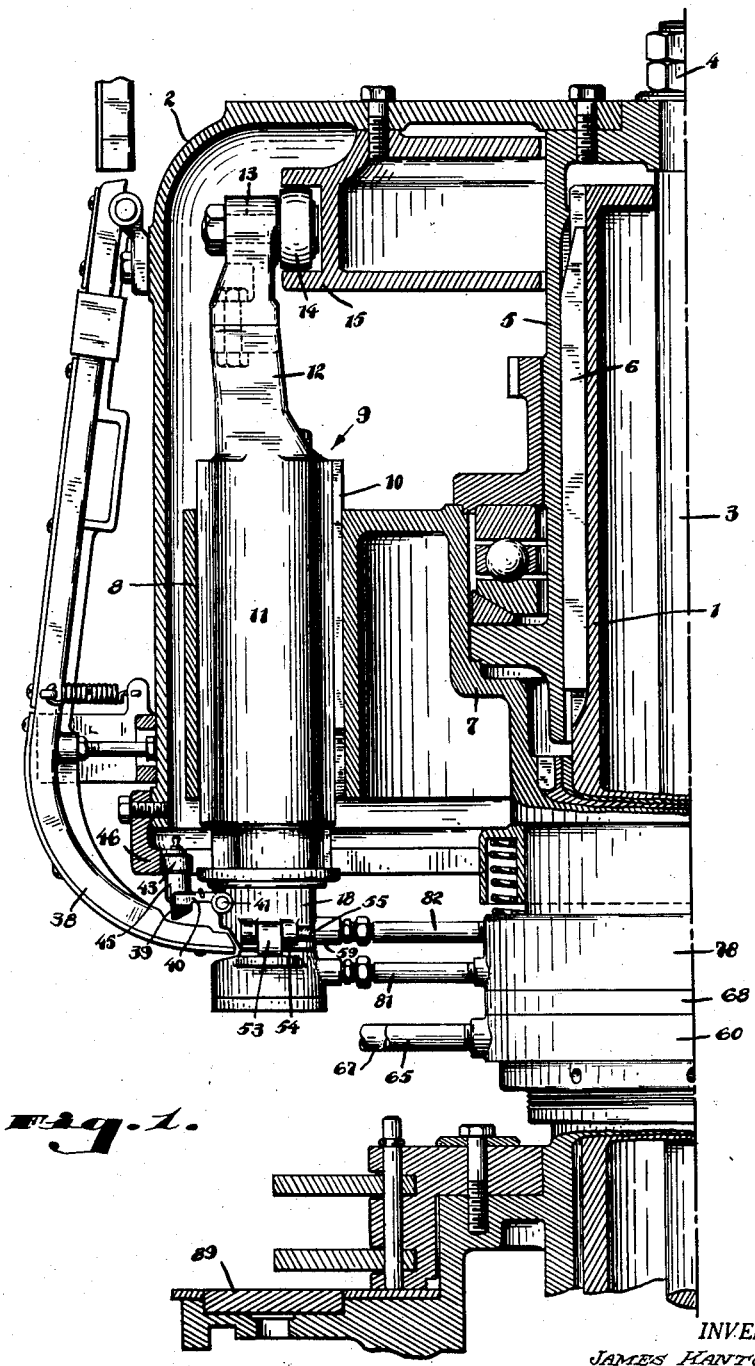

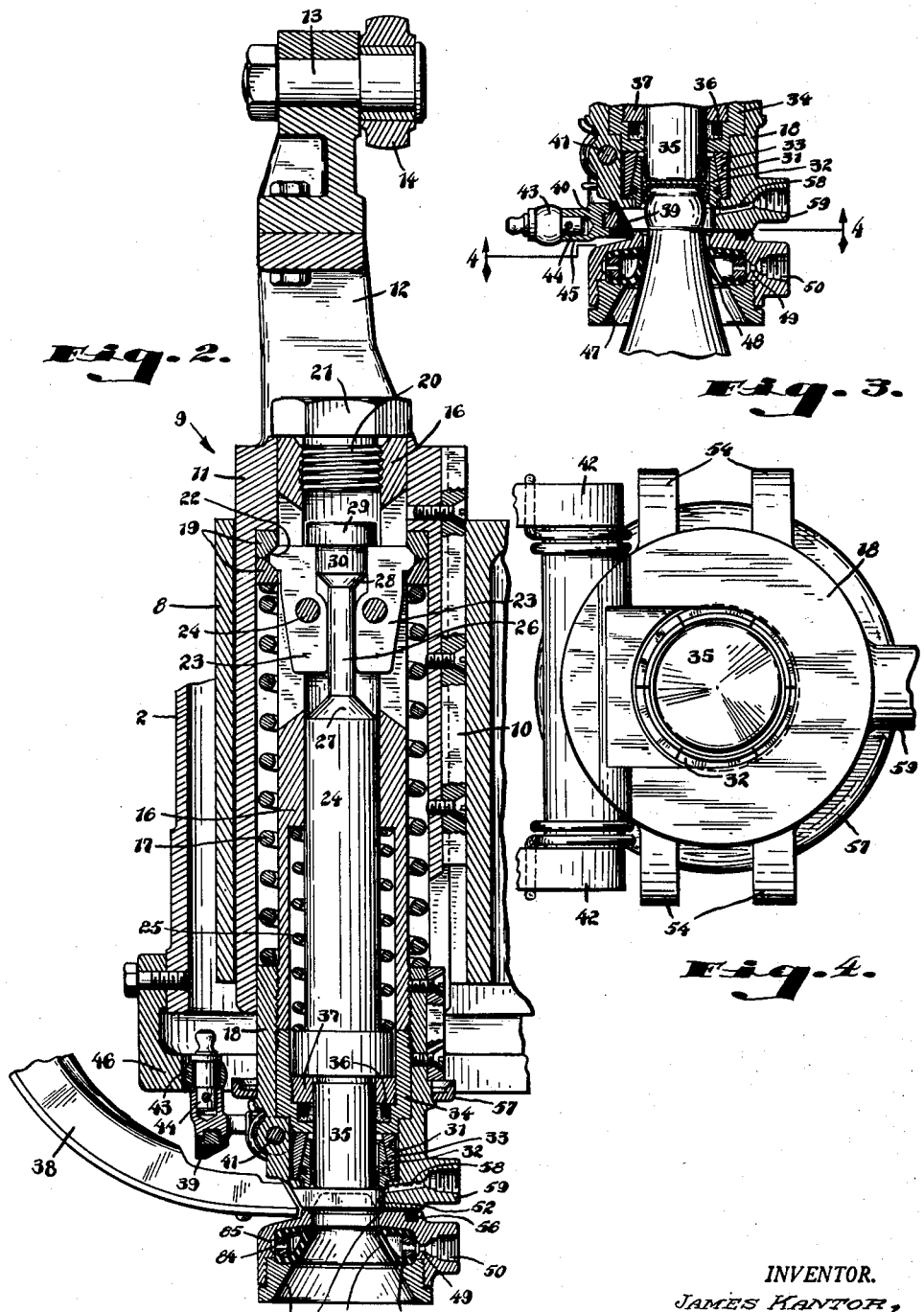

APPARATUS FOR CROWNING CONTAINERS UNDER VACUUM

Filed May 11, 1949        3 Sheets-Sheet 3

INVENTOR.
JAMES KANTOR,
BY
H. P. Hahn.
ATTORNEY.

Patented Feb. 23, 1954

2,670,117

UNITED STATES PATENT OFFICE 2,670,117

APPARATUS FOR CROWNING CONTAINERS UNDER VACUUM

James Kantor, Chicago, Ill., assignor to The Liquid Carbonic Corporation, Chicago, Ill., a corporation of Delaware Application May 11, 1949, Serial No. 92,546

7 Claims. (Cl. 226—82)

The present invention relates to improvement in apparatus for applying crowns or caps to filled containers while the containers are subject to vacuum or partial vacuum for the purpose of exhausting the air therefrom.

In the filling of beverage containers, after the container has been filled to the desired level, there is left at the top of the container a small portion of the container unfilled. This unfilled portion of the container contains air which, when the crown is applied to the container, is sealed therein and which, particularly in carbonated beverages such as beer and the non-alcoholic carbonated beverages has a deteriorating effect on the beverage. As a period of time has elapsed, it has been found that this small amount of air will affect the test and color, particularly of the beer, and is likewise detrimental to other carbonated beverages.

It is one of the objects of my invention to provide an apparatus for applying the crowns to the filled containers which just prior to the application of the sealing of the crown to the container, draws a vacuum around the neck of the container to thereby evacuate such air as may be contained in the space above the liquid level in the container.

It is a further object of my invention to provide means for sealing the crowning throat, which surrounds the container neck, immediately after the deposit of a crown on said throat, so that the air in said throat may be exhausted and with it the air in the container above the liquid level.

It is a further object of my invention to provide a crowning mechanism having the above characteristics in which the crown will be accurately positioned for placement upon the top of the bottle and thereby avoid any danger of crushing the crown and therefore the neck of the bottle, or any danger of the crown becoming "cocked" when being placed on the container.

Further objects and advantages of my invention will appear herinafter in the specification and appended claims.

For the purpose of disclosing my invention I have illustrated an embodiment thereof in the accompanying drawings wherein:

Fig. 1 is a longitudinal sectional view of so much of a crowning machine as is necessary for illustrating my invention;

Fig. 2 is a longitudinal sectional view of a crowning head embodying my invention;

Fig. 3 is a detailed sectional view showing the bottle in position with the crown applied thereto and before the crown moves to retracted position;

Fig. 4 is a transverse section taken on the lines of 4—4 of Fig. 3;

Figure 5:
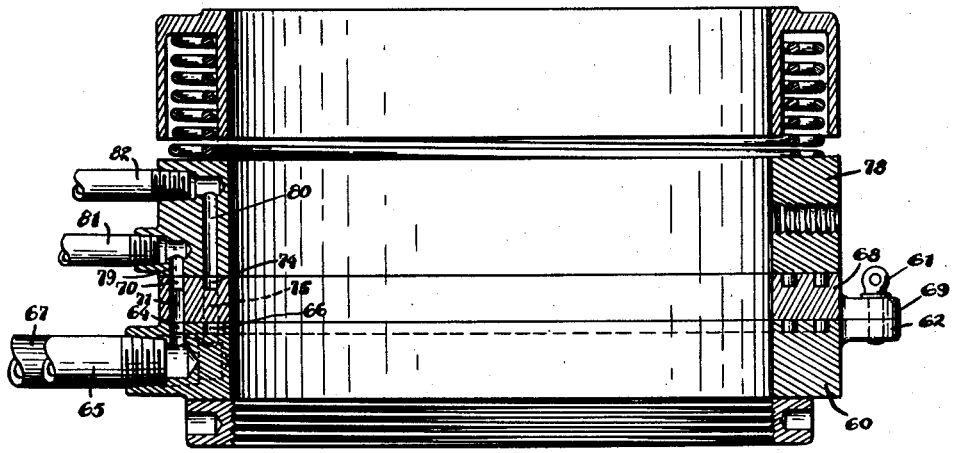
Fig. 5 is a detailed section showing the connecting means between the crowning head and the vacuum and pressure producing apparatus.
Figures 8, 9, 10:
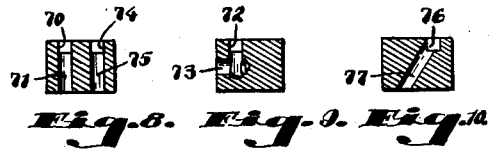
Figs. 8, 9 and 10 are respectively, sectional views on lines 8—8, 9—9, 10—10 of Fig. 7.
Figure 6:
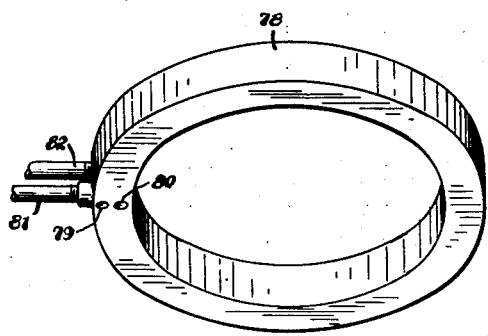
Fig. 6 is a perspective view of one of the control rings.
Figure 7:
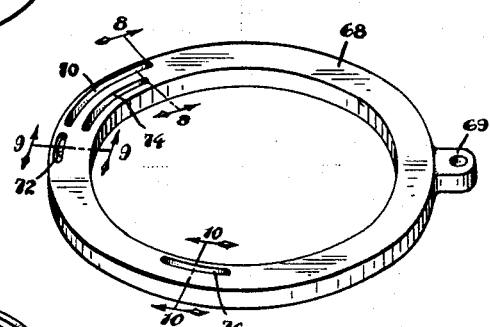
Fig. 7 is a perspective view of a second control ring.
Figure 11:
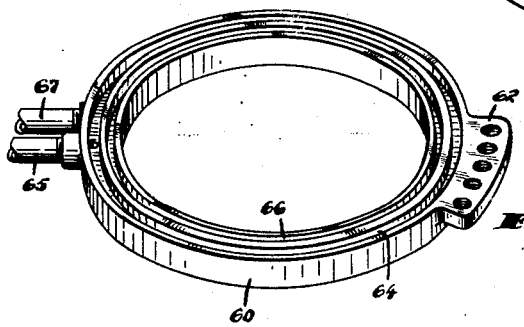
Fig. 11 is a perspective view of the control ring associated with the ring in Fig. 7.

In the structure illustrated a preferable hollow support 1 extends upwardly from a base supporting mechanism (not shown) and carries in addition to the rotating parts of the column, a stationary housing 2 which surrounds the crowning heads. This housing 2 is secured in position upon the center post through a medium of a clamping rod 3 which extends through the center of tthe center post and through the top of the housing, being provided with a clamping member 4.

The housing 2 has secured thereto a sleeve 5 which is also keyed to the center post through the medium of suitable keys 6, so that this sleeve will be held in a non-rotatable position.

Surrounding the sleeve 5 and rotatably supported thereon is a hub 7 which carries a plurality of cylindrical guides 8, each of which is adapted to accommodate a crowning head 9. The crowning head 9 is reciprocally mounted within the sleeve, but is held rotatably stationary relative to the sleeve through the medium of keys 10.

Each of the heads, which comprise a cylindrical housing 11, is provided with a top yoke 12 carrying at its upper end a stud 13 on which is mounted a roller 14. This roller operates in a cam track 15, which, it is to be noted, is stationarily mounted within the housing 2. Therefore as the crowning head rotates the roller 14, cooperating with the cam 15, will cause the crowning head to reciprocate vertically. With the bottle vertically stationarily supported on a suitable table beneath the crowning head, as the head is moved downwardly, the neck of the bottle will be embraced by the crowning throat and associated parts for the application of the crown thereto. While, for convenience, I use the expression bottle it will be understood that this term is comprehensive enough to include other types of containers.

The housing 11 has reciprocally mounted therein a hollow stem 16 which is biased toward the lower end of the housing through the medium of a coiled spring 17 surrounding the stem and abutting against the top of a collar 18 threaded to the lower end of the stem and against locking rings 19—19 arranged in the top of the housing 11. This stem extends upwardly through a restricted opening in the top of the housing 11 and is closed at its top by a threaded plug 20 having an enlarged nut 21 at its top. This enlarged nut acts as a limit stop to limit the downward movement of the stem 16 under the influence of the spring 17.

During a certain portion of the operation of the crowning head, this stem 16 is adapted to be locked against movement relatively to the housing 11 and to this end the rings 19—19 have their abutting edges beveled to form a V-shaped slot 22. The side walls of the stem 16 are slotted to receive a pair of locking dogs 23 pivoted at 24 to the stem 16 and adapted to be oscillated on their pivots to swing their tapered upper ends into and out of the wedge shaped slot 22.

The locking dogs are moved into and out of locking position and maintained in a locking position under certain conditions, through a medium of a plunger 24 mounted within the stem 16 and biased in a downward direction by a coiled spring 25 interposed between the spaced shoulders on the plunger 24 and on the stem 16. The upper end of this plunger 24 is provided with a reduced shank 26 forming a cammed shoulder 27 and a second cammed shoulder 28, while the top of the plunger is provided with an enlarged head 29 and with a slightly reduced boss 30. With the parts in the position illustrated in Fig. 2, it is to be noted that the boss 30 fits between the upper ends of the dog 23 holding their edges into the V-shaped slot 22 so that the stem 16 is locked against any upward movement relative to the housing 11. When the plunger 24, however, is moved upward the boss 30 will move out from between the top ends of the dogs and release the dogs. At the same time the cammed surfaces 27 will engage the bottom inner edges of the dogs operating upon the bottom inner edges and withdrawing the locking edges from the V-shaped groove 22, thus releasing them stem 16 and permitting the same to move upward.

The collar 18, at its lower end, is provided with a crowning throat and to this end the lower end of the collar 18 is provided with a cylindrical throat 31 which comprises a pair of wedge shaped rings, the ring 32 being segmented and adapted to be contracted about the side of the lip of the crown and the ring 33, comprising a means for contracting the crimping ring 32. The contracting ring 33 is forced downwardly by a cup like member 34 clamped between the end of the stem 16 and an internal shoulder on the collar 18. This cup like member is provided with a central opening to receive the lower end 35 of the plunger 24. In order to seal the plunger or the crowning throat against the escape of air past the plunger, I provide a grommet 36 which surrounds the plunger and is squeezed against the plunger by a ring nut 37 which screws down on top of the grommet and cramps the same on the inturned flanges at the bottom of the collar 34.

At the side of the collar 31 I provide a slot sufficiently wide to permit the insertion therethrough of the crown which is adapted to be placed on the bottle. This crown is delivered into position from the crown chute 38. This chute is supported, as shown in Fig. 1, on the housing 2 and is so positioned that as the crowning head moves in its rotative movement to a point opposite the chute a crown will be delivered into the crown throat. This receiving slot for the crown is closed, after the crown has been placed in position, through the medium of a closure member comprising a preferably rubber stopper 39 mounted on the face of an arm 40 pivoted on a pivot pin 41 supported between bearing member 42 on the collar 31. Coiled springs disposed at the opposite ends of the pivot member bias the arm 40 into a position to move the stopper member 39 into sealing position. The arm 40 is maintained in its open position through the medium of a roller 43 mounted on a stem 44 carried on an arm 45 extending at right angles to the arm 40. During that portion of the travel of the crowning head prior to the deposit of a crown into position, this roller 43 bears upon a cam 46 on the housing 2 to maintain the closure member 39 in an open position.

Supported beneath the crowning throat is a centering bell which is provided with a tapered throat 47 for the reception and guidance of the bottle. This centering bell has an annular groove therein which receives a sealing ring 48 which comprises a tubular ring clamped into position within the groove and being tubular the ring is hollow having, however, a communicating port 49 with an inlet 50 for purposes more fully hereinafter described. Above the sealing ring 48 is disposed a crown rest 51 which comprises a tapered shoulder slightly smaller in diameter than the lip of a crown so that a crown, when delivered from the crown chute into the throat, will be positioned in centered alinement with the center of the neck of the bottle. It is to be noted that the opening 52 at the lower end of the crown throat and immediately above the crown rest 51 is of a diameter only very slightly greater than the diameter of the crown and its flared lip so that when the crown is delivered from the crown chute 38 into the crown throat and in a position on the crown rest there is no danger of the crown being displaced on the crown rest or "cocked." The arrangement insures the absolute centering of the crown with respect to the bottle neck.

The centering bell and its associated guiding throat 47 is made separately from the crown throat and is secured to the crown throat through the means of lugs 53 on the rest member which fit between ears 54 on the throat collar 31, suitable restraining pins 55 being passed through the ears and through the lugs. In order to make a tight seal joint between the bell and the bottom of the throat the top face of the bell is provided with a gasket 56.

The lower end of the stem or cylinder 18 is provided with a cup like collar 57 for catching any oil drip or the like which may flow down on parts and preventing the same to flow onto the top of the bottle or getting into the crown throat.

The crown throat is provided with a port 58 communicating with a port nipple 59. Through the medium of this port a vacuum or partial vacuum is drawn in the crown throat prior to the sealing of the top of the bottle by the crown.

For controlling the vacuum in the crown throat and the pressure in the sealing ring 48, the respective chambers are adapted to be connected with a vacuum pump and an air pressure pump.

To this end the hub 7 is provided with control valve rings which control the connections between the vacuum pump and the crown throat and the pressure pump and the sealing ring. A supply ring 60 surrounds the hub 7, but is stationary relatively to the hub, being held stationary by the pipes 65 and 67. This supply ring is provided on its top face with an annular groove 64 connected by a pipe 65 with any suitable source of pressure as for instance, a pressure pump. A second annular groove 66 is provided in the top face of the ring, concentric with the groove 64 and this groove 66 is connected by a pipe 67 with a suitable vacuum pump or other vacuum producing apparatus.

Cooperating with the supply ring 60 is what may be termed a valve ring 68. This ring is likewise held in non-rotatable position through the medium of a pin 61 passing through an opening in a holding dog 69 and through a selected one of a plurality of openings in a lug 62 on the ring 60. In effect the rings 60 and 68 are one and the same. The ring 68 is provided with what may be termed a groove 70, on its upper face and communicating through a port 71 with the groove 64. The ring 68 is also provided with a pressure exhausting groove 72 communicating through a port 73 with the atmosphere.

A vacuum control groove 74 is provided on its upper face, concentric with the groove 70 and this groove, through a port 75, communicates with the vacuum groove 66 in the ring 60. This vacuum groove 74 is somewhat shorter than the groove 70 so that sealing pressure may be applied to the ring 48 prior to the drawing of the vacuum in the crowning throat. In addition to the vacuum groove 74 the ring 68 is provided with a pressure groove 76 circumferentially separated from the vacuum groove 74 and this pressure groove communicates through the medium of a port 77 with a pressure groove 64 in the ring 60.

Disposed above the valve ring 68 is a communication ring 78 which is rotatable with the hub 7. This ring is provided with a pressure port 79 adapted at one period of rotation of the hub 7 to communicate with the pressure supply grooves 70 and 72. The ring 78 is also provided with a vacuum port 80 adapted during certain portions of the rotation of the ring 78 to communicate with the vacuum grooves 74 and 76 in ring 68.

Port 79 is connected by a suitable pipe or flexible hose connection 81 with the nipple 50 on the crowning head, and thereby with the sealing ring 48. Port 80 is connected by a suitable connection, pipe or flexible hose, 82 which in turn is connected with the nipple 59 and therefore communicates with the crown throat.

In operation, as the crowning head rotates, the bottle to be crowned is positioned on the table 89 immediately beneath the crowning head. During this initial operation the gate or stopper 39 is open, in the position illustrated in Fig. 2, being held open by the cam 46. When the crowning head moves to its station opposite the crown chute 38 a crown is fed out of the crown chute 38 into the crowning throat. It will be noted as heretofore explained, that the crowning throat is of just sufficient diameter to accommodate a crown with its lip expanded. Accordingly the crown will immediately position itself on the crown rest, which, as heretofore explained, has a tapered seat so that the crown will be exactly centered with respect to the bottle. A continued rotation of the crowning head moves the roller 43 out of engagement with the cam 46 so that the coiled springs will move the gate 39 to closed position thus pushing the crown into position on the crown rest and sealing the crown receiving opening in the side wall of the crown throat. With the continued rotation of the crown head the roller 14 and cam track 15 will cause the crown head to descend and as the crown head descends the top of the bottle is engaged and centered by the centering bell 47 so that the neck of the bottle will be guided and project through the crown rest receiving the crown on the top of the bottle.

At about this period the pressure groove 70 is placed in communication with the interior of the ring 48 and air under pressure being admitted to the interior of the ring 48 will expand this ring, or if the expression is preferable, will contract the ring around the neck of the bottle sealing this portion of the crown throat against the atmosphere. We therefore have at this point a sealing crowning throat sealed against the admission of atmospheric pressure. Immediately after the neck of the bottle is sealed by the ring 48 the groove 74 comes into action placing the crown throat, through the port 35 and associated parts, in communication with the vacuum producing means and a vacuum or partial vacuum is drawn in the crown throat to exhaust the air therefrom and from the head space of the bottle. The degree of vacuum is very carefully controlled or regulated so as to remove as much air as possible from the head space in the bottle and any surface foam which may be contained in this head space, but is not sufficiently great to agitate the contents of the bottle.

With a continued rotation of the head the plunger 24 contacts the top of the cap or crown lying on the bottle firmly setting same thereon. At this point, during the descent of the head, the plunger comes to a stop so that with the continued downward movement of the stem 16 the crimper is moved down into engagement with the lip of the crown, crimping same around the bottle. During this operation the head maintains the crown tightly secured on the bottle, but with the continued descent of the stem the cam surface 27 engages the lower ends of the dogs 23 spreading the same and disengaging the ends of the dogs from the V-shaped slot 22 thus releasing the stem 16 from the housing 11 so that the stem will remain relatively stationary during any further descent of the housing. This avoids any danger of crushing the bottle and at the same time compensation is made for different sizes or heights of the bottle.

Bearing in mind that the head, during the above operation, is rotated, by the time the crown is effectually sealed or crimped onto the bottle, the escape port 72 is brought into communication with the sealing ring 48 thus shutting off communication of the sealing ring with the pressure supply and placing the sealing ring in communication with the atmosphere so that the neck of the bottle is released. Immediately prior to this moment the port 80 has moved out of communication with the groove 74 so that the crown throat is disconnected from the vacuum producing means and with the sealing ring released, atmospheric pressure may be admitted to the crowning throat.

As the crowning head continues to rotate the crowning head will be moved upwardly and during this period the crown throat will be placed in communication for a short period through the pressure groove 76 with the pressure pump so that air under pressure will be delivered in the crown throat blowing out of the crowning throat any foam, particles of glass or other foreign matter which may have been trapped therein.

It is to be noted, that the ring 48 is clamped onto a metal ring 83 which ring is provided with a series of inlet ports 84 connecting with an annular groove 85 in turn communicating through the port 49 with the nipple 50. Therefore upon the admission of air under pressure through the port 49 the air will rapidly enter the ring 48 at numerous points at the circumference, causing more or less expansion simultaneously in the ring against the neck of the container.

I claim as my invention:

1. In an apparatus of the character described, in combination, a crowning head having a crown throat at its lower end; a crown crimping means arranged in said throat; said throat having a crown receiving aperture in the side wall thereof; a centering bell rigidly supported from said head below said throat and having a central container neck receiving opening therein and an annular crown rest surrounding said opening and disposed beneath said throat; means for effecting a sealing contact between said bell and said throat; inflatable means in said bell for sealingly engaging the neck of the container projected through said opening in said bell and providing by said sealing engagement a chamber above the mouth of the container in said throat; a gate for sealingly closing the aperture in the side walls of the throat to seal said chambers; means for biasing said gate in its closed positions; means for maintaining said gate in its open position and adapted to release said gate after the crown has been deposited in said throat to permit said throat to be closed and seal the closing aperture in the side walls of the throat to provide a seal for said chamber; means for exhausting the air from said chamber and means for operating said crimper to crimp the crown on said container neck during the period the air is exhausted from said chamber.

2. In an apparatus of the character described, in combination, a crowning head having a crown throat at its lower end; a crown crimping means arranged in said throat, said throat having a crown receiving aperture in the side wall thereof; a centering bell rigidly supported from said head below said throat and having a central container neck receiving opening therein and an annular crown rest surrounding said opening; the walls of said crown rest being inclined downwardly and the diameter of said throat being substantially the same as the greater diameter of the crown rest; means for effecting a sealing contact between said bell and throat; inflatable means in the bell for sealingly engaging the neck of a container projected through said opening in said bell and providing by said sealing engagement a chamber above the mouth of the container in said throat; a gate for sealingly closing the aperture in the side wall of the throat to seal said chamber; means for effecting the closure of said gate when the neck of the container is sealed in said bell and after a crown has been deposited through said side wall aperture onto said crown rest; means for exhausting air from said sealed chamber and means for operating said crimper to crimp the crown on said container neck during the period the air is exhausted from said chamber.

3. In an apparatus of the character described, in combination, a crowning head having a crown throat at its lower end; a crown crimping means arranged in said throat, said throat having a crown receiving aperture in the side wall thereof; a centering bell rigidly supported from said head below said throat and having a central container neck receiving opening therein and an annular crown rest surrounding said opening and disposed beneath said throat, said crown rest having downwardly inclined crown supporting walls tapering inwardly toward the center opening of the rest; the diameter of said throat with the gate closed being substantially the same as the greater diameter of said crown rest; means for effecting a sealing contact between said bell and said throat; means in said bell for sealingly engaging the neck of a container projected through the throat in said bell and providing by said sealing engagement a chamber above the mouth of the container in said throat; a gate for sealingly closing the aperture in the side walls of the container to seal said chamber; means for effecting the closure of said gate when the neck of the container is sealed in said bell and after a crown has been deposited through said side wall aperture onto said crown rest; means for exhausting the air from said sealed chamber and means for operating said crimper to crimp the crown on said container neck during the period the air is exhausted from said chamber.

4. In an apparatus of the character described, in combination, a crowning head having a crown throat at its lower end; crown crimping means arranged in said throat, said throat having a crown receiving aperture in the side wall thereof; a centering bell rigidly supported from said head below said throat and having a central container neck receiving opening therein and an annular crown rest surrounding said opening and disposed beneath said throat; means for effecting a sealing contact between said bell and said throat; a hollow sealing ring disposed in said centering bell; means for admitting air under pressure to the interior of said sealing ring to expand the inner walls thereof into sealing engagement with the neck of a container projected through said bell opening; a gate for sealingly closing the aperture in said side wall of the throat to provide in said throat a sealed chamber; means for effecting the closure of said gate when the neck of the container is sealed in said bell and after a crown has been deposited through said side wall aperture onto said crown rest; means for exhausting the air from said sealed chamber and means for operating said crimper to crimp the crown on said container neck during the period the air is exhausted from said chamber.

5. In an apparatus of the character described, in combination, a crowning head having a crown throat at its lower end; crown crimping means arranged in said throat, said throat having a crown receiving aperture in its side wall; a centering bell rigidly supported from said head below said throat and having a central container neck receiving opening therein and an annular crown rest surrounding said opening and disposed beneath said throat; means for effecting a sealing contact between said bell and said throat; means in said bell for sealingly engaging the neck of a container projected through the opening in said bell and providing a chamber above the mouth of the container in said throat; a closure gate for said aperture pivotally mounted on the side wall of said crowning throat and swingable from an open position to a position to close said aperture; spring means biasing said gate into closed position; a bell crank lever connected to said gate; a relatively stationary cam engageable by said gate for moving said gate into an open position, said cam effecting the release of said gate to effect the closure thereof under the influence of said spring to seal the chamber above the throat of a container projected into said bell after a crown has been deposited through said side wall aperture onto said crown rest; means for exhausting the air from said sealed chamber and means for operating said crimper to crimp the crown on said container neck during the period the air is exhausted from said chamber.

6. In an apparatus of the character described, in combination, a crowning head having a crown throat at its lower end; crown crimping means arranged in said throat; said throat having a crown receiving aperture in the side wall thereof; a centering bell rigidly supported from said head below said throat and having a central container neck receiving opening therein and an annular crown rest surrounding said opening and disposed beneath said throat; a hollow sealing ring mounted within said centering bell and adapted to make sealing engagement with the neck of a container projected through said throat; a gate for sealingly closing the aperture in the side wall of said bottle, said gate and sealing ring cooperating to provide a sealed chamber receiving the neck of a container; means for supplying air under pressure to said hollow ring to expand the inner walls thereof into contact with the neck of the container; means for exhausting the air from said sealed chamber and means for operating said crimper to crimp the crown on said container neck while said chamber is exhausted; valve means for controlling the admission of air under pressure to said sealing ring and controlling the exhaustion of air from said chamber, said crowning head being movable in a fixed path of travel and said valve means being operated by the movement of said head in its fixed path of travel to initially admit air under pressure to said sealing ring, and then connecting said chamber with said exhaustion means while continuing the admission of air under pressure to said sealing ring.

7. In an apparatus of the character described, in combination, a crowning head rotatable in a fixed path of travel and having a crowning throat provided with a crown receiving aperture in its side wall; a crown crimping means arranged in said throat; a centering bell rigidly supported from said head below said throat and having a central container neck receiving opening therein and an annular crown rest surrounding said opening and disposed beneath said throat; means for effecting a sealing contact between said bell and said throat; a hollow sealing ring disposed within said centering bell and having its inner walls expandable into sealing engagement with the neck of a container projecting through said bell; a gate for closing said aperture and when closed to provide with the sealing of the neck of the container a sealed chamber; means for closing said gate after a crown has been inserted through said aperture and deposited upon said crown rest; vacuum producing means connected with said chamber and pressure producing means connected with said ring; valve controlling means and means operated by the rotated movement of said head for operating said valve controlling means to initially admit pressure through said pressure connection to said ring and then effect an exhaustion of the air in said chamber through said connection with said vacuum producing means while maintaining said pressure in said ring and then connecting said ring with the atmosphere and finally connecting said chamber with said pressure producing means.

JAMES KANTOR.

References Cited in the file of this patent

UNITED STATES PATENTS

| Number | Name | Date |
| --- | --- | --- |
| 1,188,044 | Clay | June 30, 1916 |
| 1,881,783 | Mallinckrodt et al. | Oct. 11, 1932 |
| 2,235,583 | Kronquest et al. | Mar. 18, 1941 |
| 2,378,640 | Kantor | June 19, 1945 |
| 2,411,232 | Sedwick | Nov. 19, 1946 |